US012710045B2

(12) United States Patent
Wegner et al.

(10) Patent No.: US 12,710,045 B2
(45) Date of Patent: Aug. 18, 2026

(54) METHOD FOR PRODUCING A SUBMERSIBLE MOTOR PUMP

(71) Applicant: WILO SE, Dortmund (DE)

(72) Inventors: Benjamin Wegner, Dortmund (DE); Bernd Huster, Dortmund (DE)

(73) Assignee: WILO SE, Dortmund (DE)

( * ) Notice: Subject to any disclaimer, the term of this patent is extended or adjusted under 35 U.S.C. 154(b) by 160 days.

(21) Appl. No.: 18/455,703

(22) Filed: Aug. 25, 2023

(65) Prior Publication Data

US 2024/0068480 A1 Feb. 29, 2024

(30) Foreign Application Priority Data

Aug. 31, 2022 (BE) .................................. 2022/5692

(51) Int. Cl.
*F04D 13/08* (2006.01)
*E03F 5/22* (2006.01)
(Continued)

(52) U.S. Cl.
CPC .............. *F04D 13/086* (2013.01); *E03F 5/22* (2013.01); *F04D 29/605* (2013.01); *H02K 5/225* (2013.01); *H02K 15/14* (2013.01); *H02K 5/132* (2013.01)

(58) Field of Classification Search
None
See application file for complete search history.

(56) References Cited

U.S. PATENT DOCUMENTS 3,611,257 A * 10/1971 Carkhuff ................ H01R 43/24 439/587
4,019,836 A * 4/1977 Deters ................. F04D 13/0693 415/901
(Continued)

FOREIGN PATENT DOCUMENTS

CN 109891718 A * 6/2019 ............. E21B 43/12
DE 4230138 A1 * 3/1994 ........... F04D 13/086
(Continued)

OTHER PUBLICATIONS

Translation of CN 109891718, Zugelder (USPTO Search) (Year: 2025).*
(Continued)

*Primary Examiner* — Dominick L Plakkoottam
*Assistant Examiner* — Geoffrey S Lee
(74) *Attorney, Agent, or Firm* — Dority & Manning, P.A.

(57) ABSTRACT

A method for producing a submersible motor pump for pumping waste water and/or sewage includes a cylindrical pot-shaped housing forming an inner space between an open base surface and a cover surface axially opposite the base surface, including a connector opening provided in the pot-shaped housing, a motor provided in the inner space and comprising a cylinder-like stator comprising a plurality of windings and a first connector connected to ends of the windings, in particular oriented towards the cover surface and provided with at least one radially resilient latching tab, including the steps of gripping the first connector from outside the pot-shaped housing through the connector opening, inserting the first connector from the inner space into the connector opening, and latching the at least one latching tab to the pot-shaped housing.

18 Claims, 6 Drawing Sheets

(51) Int. Cl.

| | |
|---|---|
| ***F04D 29/60*** | (2006.01) |
| ***H02K 5/132*** | (2006.01) |
| ***H02K 5/22*** | (2006.01) |
| ***H02K 15/14*** | (2025.01) |

(56) References Cited

U.S. PATENT DOCUMENTS

| | | | | |
|---|---|---|---|---|
| 5,350,281 | A * | 9/1994 | Hagshenas | F04D 29/5806 417/369 |
| 5,554,010 | A * | 9/1996 | Schoedl | H02K 11/028 417/313 |
| 5,567,170 | A * | 10/1996 | Kroeber | H01R 13/523 439/186 |
| 5,571,001 | A * | 11/1996 | Fukuda | F04D 29/588 417/423.3 |
| 5,648,694 | A * | 7/1997 | Kobayashi | F04D 13/064 310/87 |
| 5,910,026 | A * | 6/1999 | Geib | H01R 13/506 439/471 |
| 6,059,578 | A * | 5/2000 | Arnett | H01R 24/64 439/43 |
| 6,126,483 | A * | 10/2000 | Kirma | H01R 13/5221 219/541 |
| 6,326,748 | B1 * | 12/2001 | Moroto | H02P 6/32 318/400.14 |
| 6,899,532 | B2 * | 5/2005 | Eddy | F04D 13/086 417/423.1 |
| 10,312,642 | B2 * | 6/2019 | Namiki | H01R 13/74 |
| 10,527,302 | B2 * | 1/2020 | Giangrande | F04D 25/08 |
| 2003/0190243 | A1 * | 10/2003 | Eddy | F04D 13/0693 417/423.3 |
| 2005/0020130 | A1 * | 1/2005 | Cavanaugh | H01R 13/5205 439/587 |
| 2005/0035593 | A1 * | 2/2005 | Auray | H02G 3/0675 285/137.11 |
| 2011/0142697 | A1 * | 6/2011 | Petrucci | F04B 17/03 417/422 |
| 2011/0263148 | A1 * | 10/2011 | Obata | H01R 13/4364 439/744 |
| 2012/0100737 | A1 * | 4/2012 | Frey | H01R 43/005 439/271 |
| 2014/0097001 | A1 * | 4/2014 | Campbell | H01B 7/1805 174/23 R |
| 2014/0335712 | A1 * | 11/2014 | Semple | E21B 43/128 439/271 |
| 2017/0187177 | A1 * | 6/2017 | Mangum | H02G 15/02 |
| 2019/0044408 | A1 * | 2/2019 | Luise | H02K 5/225 |
| 2019/0178261 | A1 * | 6/2019 | Kajikawa | H02K 5/207 |
| 2019/0203706 | A1 * | 7/2019 | Matsumoto | F04B 53/16 |
| 2019/0277305 | A1 * | 9/2019 | Chen | F04D 29/424 |
| 2020/0021160 | A1 * | 1/2020 | Kuratani | H02K 5/08 |
| 2021/0095679 | A1 * | 4/2021 | Uchino | F04D 25/08 |
| 2022/0056918 | A1 * | 2/2022 | Momeni | G01F 23/242 |
| 2023/0163535 | A1 * | 5/2023 | Glendinning | H01R 13/713 439/490 |
| 2024/0068480 | A1 * | 2/2024 | Wegner | E03F 5/22 |

FOREIGN PATENT DOCUMENTS

| | | | | |
|---|---|---|---|---|
| DE | 202004009580 U1 | * | 10/2004 | F04D 13/086 |
| JP | H 06249184 B2 | | 12/2017 | |
| WO | 2003/0190243 | | 10/2003 | |

OTHER PUBLICATIONS

Translation of DE 202004009580, Hoffmann (USPTO Search) (Year: 2025).*

Translation of DE 4230138, Arnswald (USPTO Search) (Year: 2025).*

European Search Report (w/ English translation) for corresponding Application No. BE202205692, dated Apr. 4, 2023, 18 pages.

Office Action received in corresponding Application KR 1020230112146, dated May 21, 2025, 9 pages.

* cited by examiner

METHOD FOR PRODUCING A SUBMERSIBLE MOTOR PUMP

CROSS-REFERENCE TO RELATED APPLICATIONS

The present application is based upon and claims the right of priority to Belgian Patent Application No. 2022/5692, filed on Aug. 31, 2022, the disclosure of which is hereby incorporated by reference herein in its entirety for all purposes.

TECHNICAL FIELD

The invention relates to a method for producing a submersible motor pump, in particular for pumping waste water and/or sewage, and comprising a cylinder-like pot-shaped housing forming an inner space between an open base surface and a cover surface axially opposite the base surface and comprising a connector opening provided in the pot-shaped housing and a motor provided in the inner space and comprising a cylinder-like stator comprising a plurality of windings and a first connector connected to ends of the windings. The invention further relates to a submersible motor pump for pumping waste water and/or sewage, comprising a cylindrical pot-shaped housing forming an inner space between an open base surface and a cover surface axially opposite to the base surface and comprising a connector opening provided in the pot-shaped housing and a motor provided in the inner space and comprising a cylindrical stator comprising a plurality of windings and a first connector connected to ends of the windings.

BACKGROUND OF THE INVENTION

Submersible motor pumps are known from the prior art and are used for pumping a fluid by means of a rotary motion of an impeller. The fluid to be pumped enters a pump chamber of the submersible motor pump via a suction port, is captured by the rotating impeller, and is subsequently often conveyed into a conduit section, also referred to as a pressure pipe.

Such submersible motor pumps often comprise a housing, which is configured as a cylinder-type pot-shaped housing comprising a motor provided in an inner space for driving the impeller provided below the pot-shaped housing. Such a motor comprises a cylinder-like stator comprising a plurality of windings, wherein ends of the windings are provided with a first connector. Typically, an opening is provided in a top surface of the pot-shaped housing through which a cable comprising a second connector is passed. The second connector is electrically connected to the first connector inside the pot-shaped housing.

Even though such an arrangement ensures a reliable operation of the submersible motor pump, the assembly of the connector is complex. This is because, for connection, the first connector must be led out of the opening, connected to the second connector outside the pot-shaped housing, and finally, the interconnected first and second connectors must be re-inserted into the pot-shaped housing through the opening. Finally, the cable must be sealed to the pot-shaped housing at the opening.

DESCRIPTION OF THE INVENTION

Based on this situation, it is an object of the present invention to provide a method for producing a submersible motor pump as well as a corresponding submersible motor pump which can be produced much more easily compared to the previously described submersible motor pump.

The object of the invention is achieved by the features of the independent claims. Advantageous embodiments are provided in the subclaims.

Accordingly, the object is achieved by a method for producing a submersible motor pump, in particular for pumping waste water and/or sewage, comprising

- a cylindrical pot-shaped housing forming an inner space between an open base surface and a cover surface axially opposite the base surface and comprising a connector opening provided in the pot-shaped housing,
- a motor provided in the inner space and comprising a cylinder-like stator comprising a plurality of windings and a first connector connected to ends of the windings, in particular oriented towards the cover surface and provided with at least one radially resilient latching tab, comprising the steps of:

- gripping the first connector from outside the pot-shaped housing through the connector opening,
- inserting the first connector from the inner space into the connector opening, and
- latching the at least one latching tab to the pot-shaped housing.

The object is further achieved by a submersible motor pump, in particular for pumping waste water and/or sewage, and comprising

- a cylindrical pot-shaped housing forming an inner space between an open base surface and a cover surface axially opposite the base surface and comprising a connector opening provided in the pot-shaped housing, and
- a motor provided in the inner space and comprising a cylindrical stator comprising a plurality of windings and a first connector connected to ends of the windings, in particular oriented towards the cover surface and provided with at least one latching tab, wherein
- the first connector is insertable from outside the pot-shaped housing through the connector opening from the inner space into the connector opening for latching the at least one latching tab with the pot-shaped housing.

An essential point of the proposed method as well as of the proposed submersible motor pump, hereinafter in short referred to as submersible motor pump, is that, in contrast to the embodiments known from the prior art, the first connector does not have to be led out of the pot-shaped housing for connection to a second connector, has to be re-inserted into the pot-shaped housing after the two connectors have been connected, and subsequently a cable connected to the second connector has to be sealed with respect to the pot-shaped housing. Because the first connector can be latched to the pot-shaped housing, the second connector can be simply plugged onto the first connector latched in this way for connection to it, in particular in a moisture-tight manner, which simplifies the assembly of the submersible motor pump considerably. In addition, by latching the first connector to the top housing, the proposed submersible motor pump can provide a type of seal-less sealing system.

The submersible motor pump is in principle suitable for pumping any fluid. Due to its robustness against solids and chemicals, the submersible motor pump is particularly suitable for use as a submersible waste water and/or sewage pump. Submersible waste water and/or sewage pumps are used in particular for pumping off dirty water, for example from floodwater, in flooded excavation pits, in wash houses, in muddy pits, in biotopes and/or garden ponds, from soakaways and in cellars, and in particular for pumping water with various degrees of contamination, such as stones, mud, rubble or faeces. Furthermore, the submersible motor pump can also be used for a heating system with radiators, a radiator heating system, an underfloor heating system, a ceiling cooling system, a water circulation system in a drinking water facility or a drinking water facility with storage charging system, whereby the above list is not exhaustive, but may include further types of systems not mentioned herein. The motor is arranged inside the pot-shaped housing, which pot-shaped housing is preferably configured to be moisture-proof. The motor regularly drives an impeller connected to the motor via a motor shaft for pumping the fluid. The submersible motor pump can be configured as a centrifugal pump.

The pot-shaped housing is preferably closed except for the connector opening and the open base surface, in particular moisture-proof. The connector opening is preferably provided in the cover surface axially opposite the base surface, but can alternatively also be provided in the outer surface of the pot-shaped housing. The connector opening is preferably circular in shape. The motor preferably comprises in addition to the stator a rotor which can be formed integrally with the motor shaft. The stator can be made of sheet steel and serves in a known manner as a common core for the windings, which are also called induction coils.

The ends of the windings are preferably led out of the cylinder-like stator as strands in the axial direction and are electrically conductively connected to the first connector. Preferably, the windings are configured as stranded wires. The radially resilient latching lug is preferably configured so that the resilient force acts radially outwards. This means that the latching tab for inserting the first connector into the connector opening can be compressed inwardly towards a longitudinal axis of the connector against the resilient force or strives away from the longitudinal axis due to the resilient force. The latching tab preferably extends in the axial direction, in particular parallel to plug contacts of the first connector.

In the proposed submersible motor pump, it is assumed in particular that the stator is arranged in the pot-shaped housing in such a way that the ends of the windings and thus the first connector are oriented towards the cover surface. After latching of the at least one latching tab with the pot-shaped housing, in particular at the connector opening, the first connector is connected to the pot-shaped housing in particular in a form-fitting, force-fitting and/or moisture-tight manner. However, the ends of the windings and thus the first connector can also be oriented towards the base surface.

According to a preferred further development of the method or the submersible motor pump, the first connector comprises one, in particular two, three or more, radially fixed gripping tabs, so that by gripping the gripping tab and the latching tab, in particular by means of a tool, the at least one latching tab can be radially compressed for inserting the first connector into the connector opening. The gripping and/or the insertion of the tool preferably takes place in the axial direction with respect to the first connector. The radially fixed gripping tab preferably extends in the axial direction and/or is arranged radially adjacent to the latching tab. The latching tab can comprise a radially extending latching tab opening and/or the gripping tab can comprise a radially extending gripping tab opening into which the tool can be inserted axially to compress the latching tab. Such a gripping tab allows the first connector to be gripped particularly easily on the one hand and to be inserted into the connector opening on the other hand without causing damage to the first connector.

According to another preferred further development of the method or the submersible motor pump, a holding device for the first connector arranged in the inner space and associated with the connector opening is provided, wherein the first connector is arranged in the holding device for gripping the first connector. The holding device is preferably configured as a kind of tray or holder into which the first connector is inserted when the stator is inserted into the pot-shaped housing or when the stator is placed on the pot-shaped housing. From this holding device, the stator can be gripped in a simple and defined manner to be inserted into the connector opening. The holding device is preferably arranged axially below the connector opening, as seen from the outside through the connector opening.

According to another preferred further development of the method or the submersible motor pump, the first connector has a non-rotationally symmetrical cross-section and the connector opening has a cross-section corresponding or non-corresponding to the first connector, so that the first connector is secured or not secured against rotation in the connector opening. Furthermore, such a non-rotationally symmetrical cross-section enables to form a defined plug-in position into which the second connector can be inserted for connection to the first connector.

According to another preferred further development of the method or of the submersible motor pump, the connector opening is provided in the cover surface or in an outer surface of the pot-shaped housing. Particularly preferably, the holding device is provided immediately below the connector opening. Preferably, the inner diameter of the connector opening corresponds to an outer diameter of the first connector, so that it can be fixed in place in the connector opening.

According to another preferred further development of the method or of the submersible motor pump, a second connector is provided, which can be connected to the first connector and comprises a metal sleeve and a second plug contact body made of plastic and holding a plurality of second plug contacts, wherein the second plug contact body comprises a radially outwardly extending latching lug made of plastic and the metal sleeve comprises a corresponding radially outwardly extending latching recess and a radially inwardly extending latching lug made of metal in such a way that when the second plug contact body is inserted into the metal sleeve, the latching lug made of metal first presses the latching lug made of plastic radially inwards and, after latching of the latching lug made of plastic with the latching recess, latches into the second plug contact body in particular in a sealing-free manner.

According to another preferred further development of the method or of the submersible motor pump, a second connector connectable to the first connector and comprising a second plug contact body holding a plurality of second plug contacts and forming a second connector is provided, wherein the second connector comprises on the connector side a filling opening for potting the plurality of second plug contacts in the second plug contact body with potting material and an overflow volume offset axially relative to the filling opening for collecting excess potting material emerging from the filling opening.

The second plug contact body, like a first plug contact body of the first plug-in connector, is preferably made of plastic. The filling opening and/or the overflow volume preferably extends axially into the second plug contact body.

In particular, offset means that the overflow volume is arranged axially away from the connector face with respect to the filling opening, in particular in the direction of a cable connected to the second connector, so that the excess potting material can 'overflow' from the filling opening into the overflow volume. The potting of the second plug contact body preferably takes place after connection of the second plug contacts to strands of a cable and when the second plug contact body thus connected is inserted into a second plug contact housing described below.

According to another preferred further development of the method or the submersible motor pump, a second connector connectable to the first connector and comprising a second plug contact body holding a plurality of second plug contacts, a second plug contact housing into which the second plug contact body is inserted, and an integrally formed sealing ring radially surrounding the second plug contact body is provided, wherein a first part of the sealing ring is arranged radially between the second plug contact body and the second plug contact housing and a second part rests axially on the second plug contact housing for sealing, in particular moisture-tight sealing, with respect to the pot-shaped housing and/or the first connector. The sealing ring is preferably formed from an elastomer, in particular made of rubber or a thermoplastic elastomer, and/or of plastic. The first part and the second part can be connected to each other circumferentially or at several points. Preferably, the second part comprises a circular cross-section, while the first part may comprise a flat cross-section extending axially. Preferably, the second connector and/or the first connector comprise a latching means for latching the connectors with each other.

According to another preferred further development of the method or the submersible motor pump, the first connector comprises ten axially symmetrically arranged first plug contacts and/or the second connector comprises a strain relief for a cable of the second connector which can be fixed by means of cable ties and/or binding wire. The first connector, the second connector and/or the second plug contact housing can be produced by injection molding, wherein the strain relief preferably is molded onto the second plug contact housing.

According to another preferred further development of the method or of the submersible motor pump, the pot-shaped housing is made from sheet, in particular from metal sheet and/or precious metal sheet. According to another preferred further development of the method or the submersible motor pump, the pot-shaped housing comprises a cover and the connector opening is provided in the cover. The cover may be configured to be removable and/or is preferably connected to the pot-shaped housing in a moisture-proof manner.

According to another preferred further development of the method or the submersible motor pump, an impeller driven by the motor and arranged at the base surface is provided. The impeller is preferably arranged in a pump housing, which is arranged below the pot-shaped housing, wherein the pump housing can be screwed to the pot-shaped housing in a stationary manner. Feet can be provided at the pump housing, on which the submersible motor pump can be placed.

According to a preferred further development, the method comprises the step of: gripping the first connector by means of a tool. The tool may be a pair of pliers, in particular a pair of needle-nosed pliers. Preferably, tips of the pliers are inserted through the connector opening into the pot-shaped housing to grip the first connector and subsequently guide it axially towards the pot-shaped housing for latching with the same.

The object is further achieved by a sewage lifting system comprising a submersible motor pump as described above. A sewage lifting system, also referred to as a lifting system, is generally understood to mean a pumping system that lifts sewage by means of the submersible motor pump in order to allow it to flow away. The sewage lifting system may be configured as an automatically operating system that discharges sewage that occurs below a backwater level backwater-proof or to pump the sewage to a higher level. Sewage lifting systems are often provided at the lowest point of a cellar, a pit or a shaft, in particular a pump sump, and are regularly connected to the public sewage system, for example to keep a house drainage system operational.

BRIEF DESCRIPTION OF THE DRAWINGS

In the following, the invention is explained in more detail with reference to the accompanying drawings based on preferred exemplary embodiments.

In the drawings.

DETAILED DESCRIPTION OF THE EXEMPLARY EMBODIMENTS

Figure 1:
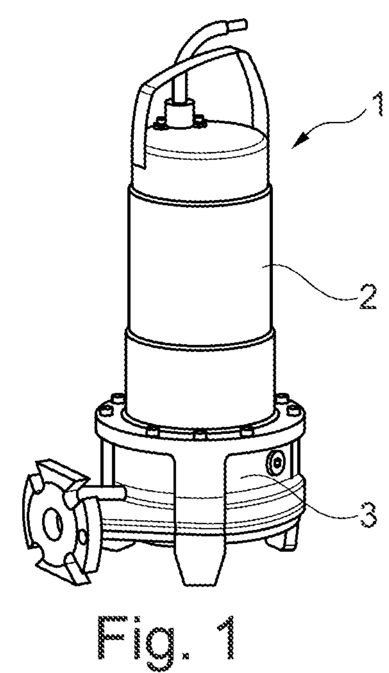
FIG. 1 is a schematic perspective view of a submersible motor pump comprising a pot-shaped housing according to a preferred exemplary embodiment of the invention.

FIG. 1 shows a schematic perspective view of a submersible motor pump 1 comprising a pot-shaped housing 2 according to a preferred exemplary embodiment of the invention. The submersible motor pump 1 is configured as a submersible waste water and/or sewage pump and can be used for pumping off contaminated water, for example, from floodwater, in flooded excavation pits, in wash houses, in muddy pits, in biotopes and/or garden ponds, from soak-aways and in cellars, and in particular for pumping water with various degrees of contamination, such as stones, mud, rubble or faeces.

Figure 2:
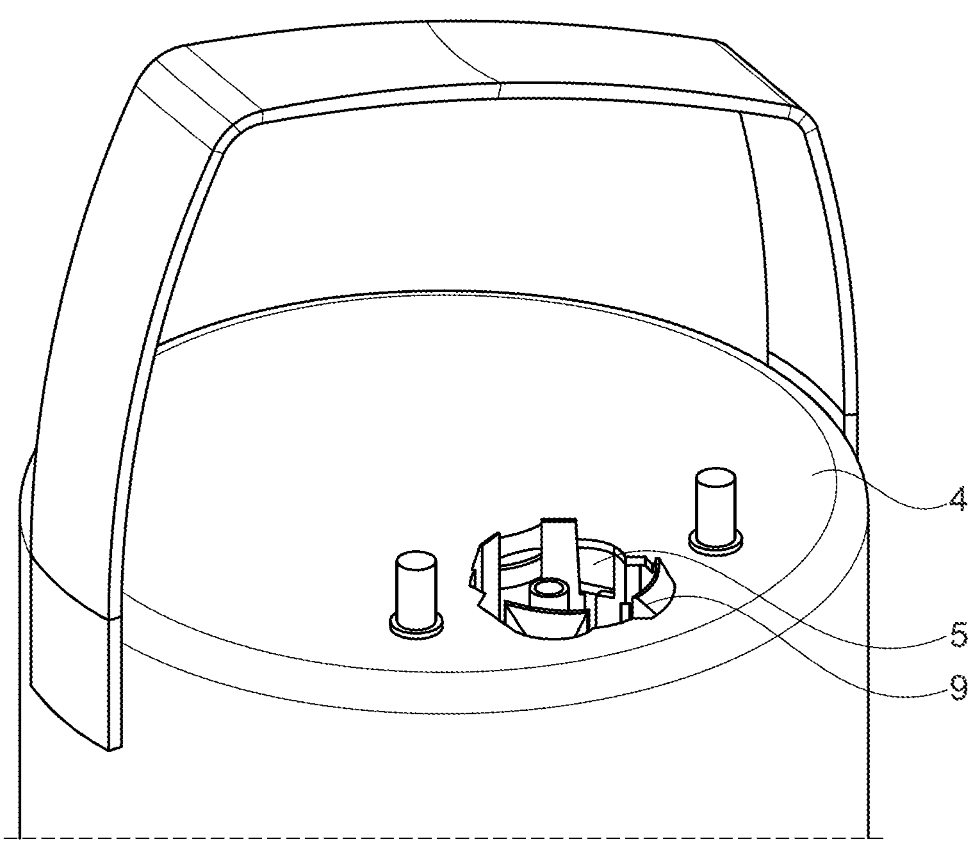
FIG. 2 is a schematic perspective view of a cover surface of the pot-shaped housing comprising a first connector latched thereto according to the preferred exemplary embodiment of the invention.
Figure 4:
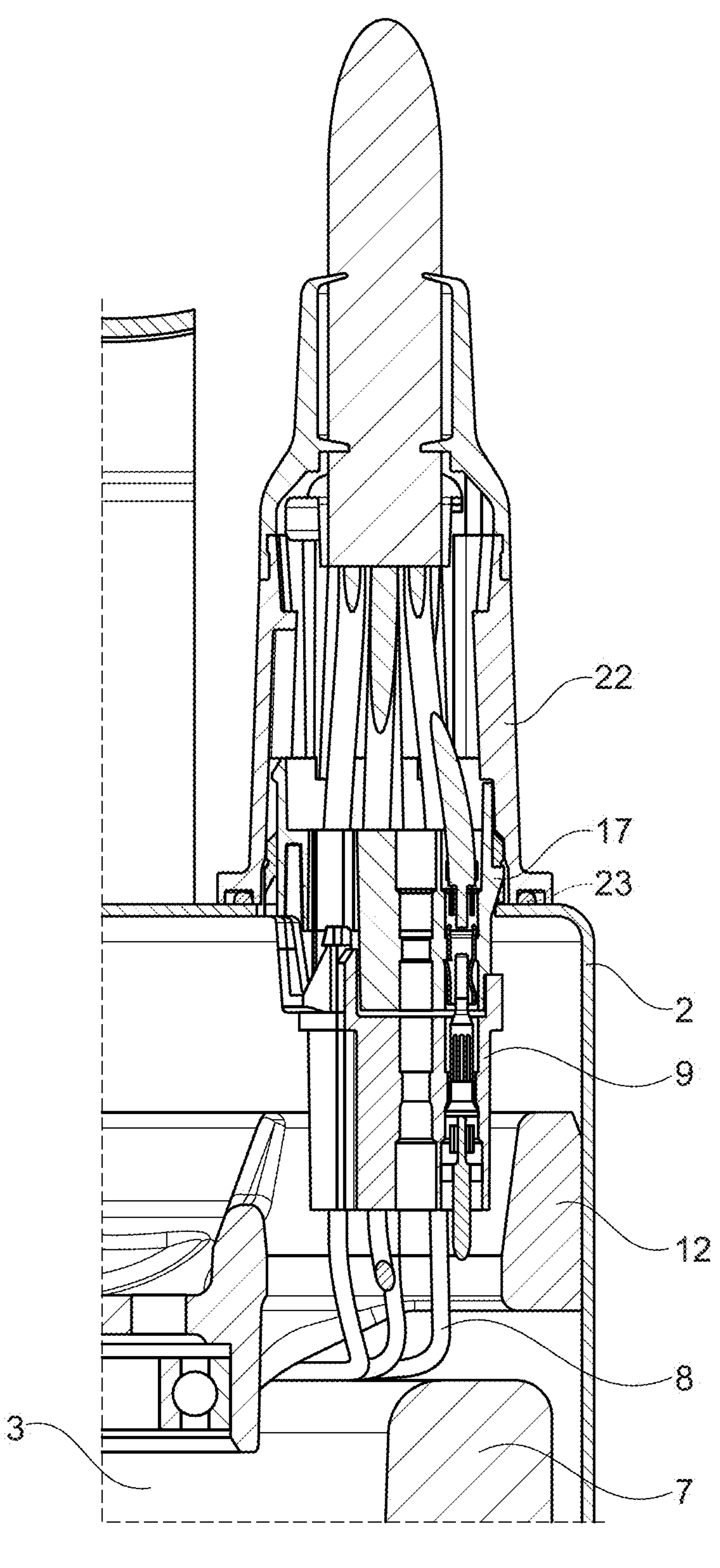
FIG. 4 is a sectional view through the pot-shaped housing comprising the first connector and a second connector connected thereto according to the preferred exemplary embodiment of the invention.

The cylindrical pot-shaped housing 2 made of sheet metal comprises an open base surface, which is adjoined by a pump housing 3 comprising an impeller provided therein, which is not shown in the figure, for pumping the waste water and/or sewage. A cover surface 4 axially opposite the base surface, which can be seen in more detail in FIG. 2, is closed except for a connector opening 5 provided therein. In this way, an inner space 6, indicated in FIG. 4, is formed between the base surface, the cover surface 4 and an outer surface of the pot-shaped housing 2.

Figure 3:
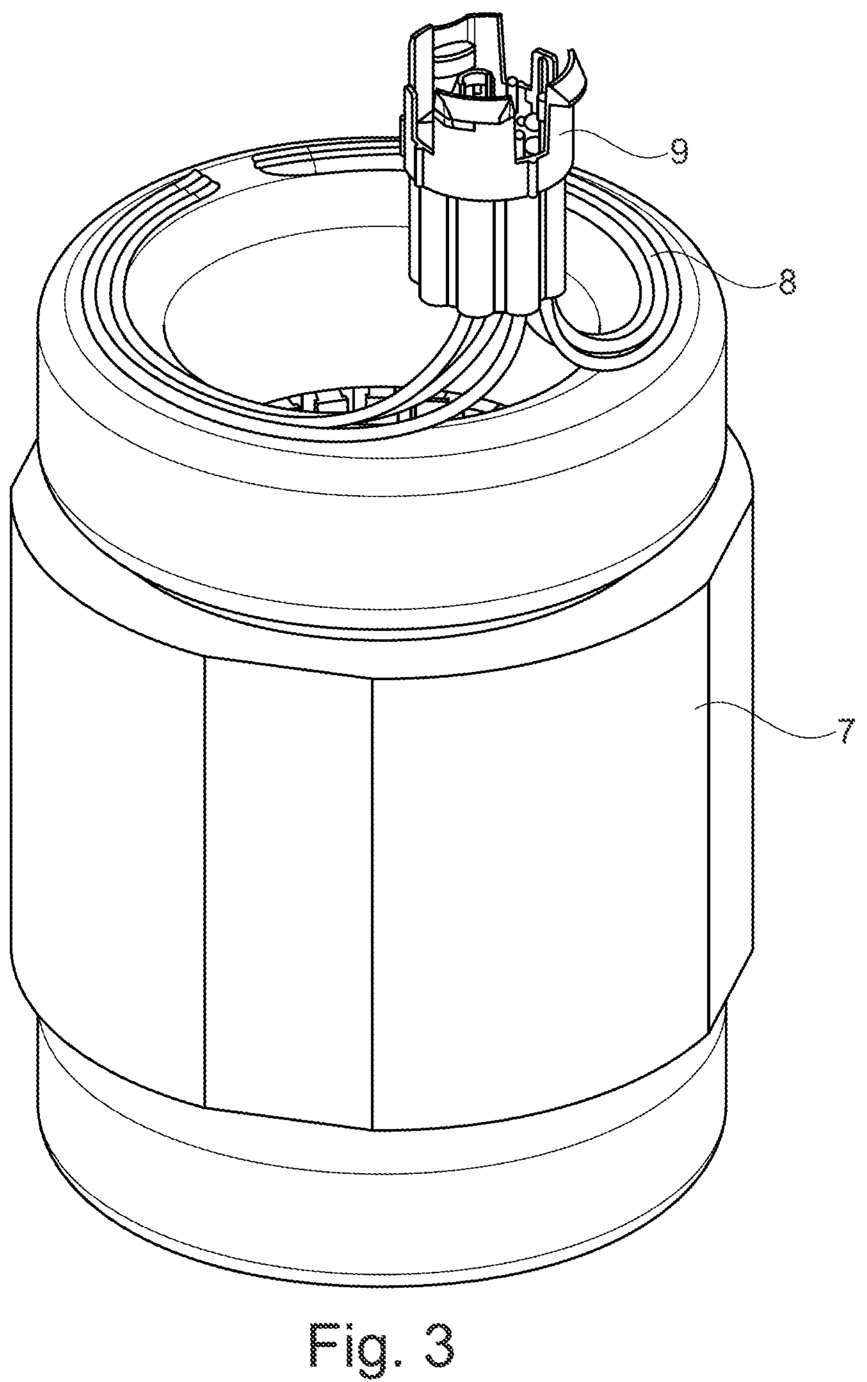
FIG. 3 is a schematic perspective view of the first connector comprising a stator of the submersible motor pump according to the preferred exemplary embodiment of the invention.

In the inner space 6 of the pot-shaped housing 2, a motor comprising a rotor not shown in more detail is provided for driving the impeller. The motor comprises a cylinder-like stator 7 shown in FIG. 3 and comprising a plurality of windings 8. Ends of the windings 8 designed as strands are led out of the stator 7 at a cover surface of the stator 7 and connected to a first connector 9 shown in more detail in FIG. 7. The stator 7 is arranged in the inner space 6 of the pot-shaped housing 2 in such a way that the cover surface of the stator 7 with the first connector 9 connected to the ends of the windings 8 is oriented towards the closed cover surface 4 of the pot-shaped housing 2, as can be seen in principle from FIG. 4.

Figures 5, 6, 7:
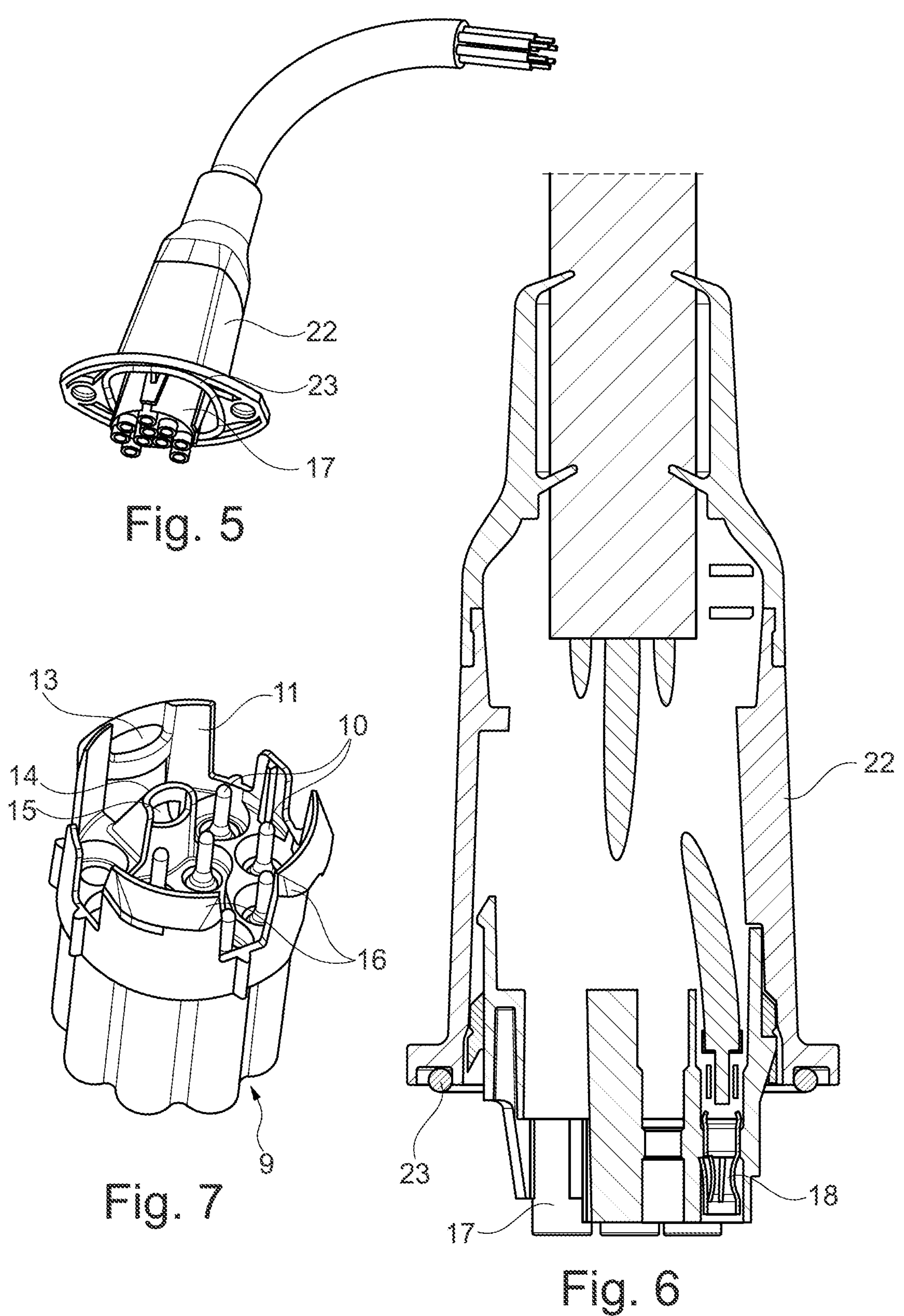
FIG. 5 is a schematic perspective view of the second connector according to the preferred exemplary embodiment of the invention.
FIG. 6 is a sectional view through the second connector according to the preferred exemplary embodiment of the invention.
FIG. 7 is a schematic perspective view of the first connector according to the preferred exemplary embodiment of the invention.

The first connector 9 shown in more detail in FIG. 7, as mentioned, is designed as a male plug with ten first plug contacts 10, which held arranged axially symmetrically in a first plug contact body made of plastic form a first connector face of the first connector 9. The first plug contacts 10 are used for the three phases L1, L2 and L3, for ground, for two winding protection contacts, for a switchgear protection contact and for corner points U1, V1 and W1 of a delta connection for the motor. The first connector 9 also comprises a radially resilient latching tab 11, which extends axially away from the first connector 9 at one edge thereof, parallel to the axis of the first connector contacts 10.

If the stator 7 is now provided in the inner space 6, for example after the pot-shaped housing 2 has been placed on the stator 7 or after the stator 7 has been inserted into the inner space 6, the first connector 9 is appropriately first inserted into a holding device 12 associated with the connector opening 5. The holding device 12 is designed as a tray and is provided axially below the connector opening 5. In this way, the first connector 9 can be gripped in the holding device 12 from outside the pot-shaped housing 2 through the connector opening 5 by use of a tool, for example a pair of needle-nose pliers, and inserted axially outwards into the connector opening 5. Since the connector opening 5 corresponds in its non-corresponding inner diameter to the non-corresponding outer diameter of the first connector 9, the latching tab 11 thus engages with the pot-shaped housing 2, as shown in FIG. 2. In this way, the first connector 9 is connected to the pot-shaped housing 2 in a force- and form-fitting manner.

As can be seen in detail from FIG. 7, the latching tab 11 comprises a radially opening latching tab opening 13. Axis-parallel to the latching tab 11, a gripping tab 14 comprising a radially opening gripping tab opening 15 provided thereon extends away from the first plug contact body. For gripping the latching tab 11 and the gripping tab 14, the needle-pointed pliers are appropriately inserted with their tips into the latching tab opening 13 and the gripping tab opening 15, so that the latching tab 11 can be radially compressed for inserting the first connector 9 into the connector opening 5. In addition to the latching tab 11, the first connector 9 comprises two further latching tabs 16 which likewise extend at the edge of the first connector 9 parallel to the axis thereof away therefrom, wherein the latching tab 11 and the two further latching tabs 16 are arranged at approximately regular intervals around the first connector face.

Figure 8:
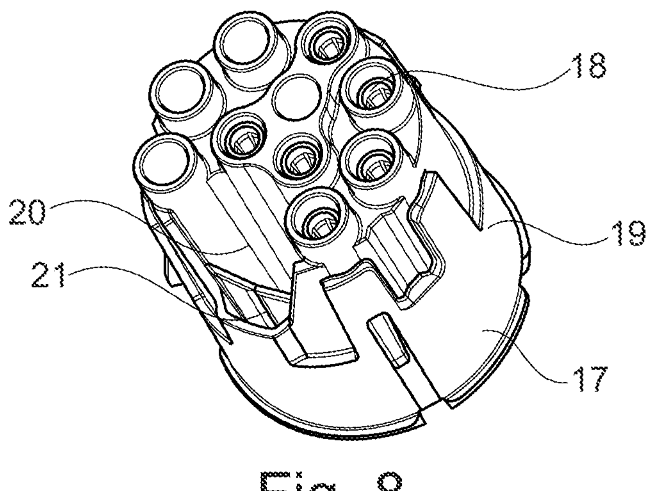
FIG. 8 is a schematic perspective view of the second connector according to the preferred exemplary embodiment of the invention.

After latching the first connector 9 to the pot-shaped housing 2, a second connector 17 can be plugged onto the first connector 9 as shown in FIG. 4. The second connector 17 is formed as a female plug and, corresponding to the first connector 9 and as shown in FIG. 8, comprises a second plug contact body 19 made of plastic which holds a plurality of second plug contacts 18 and forms a second connector face. On the connector face side, a radially extending filling opening 20 is provided, into which resin can be filled as a potting material for potting the second plug contacts 18 with strands of a cable connected thereto in the second plug contact body 19. Axially offset from the filling opening 20, i.e. away from the first connector 9, a radially opening and axially extending overflow volume 21 is provided in which excess potting material can be collected.

Figure 9:
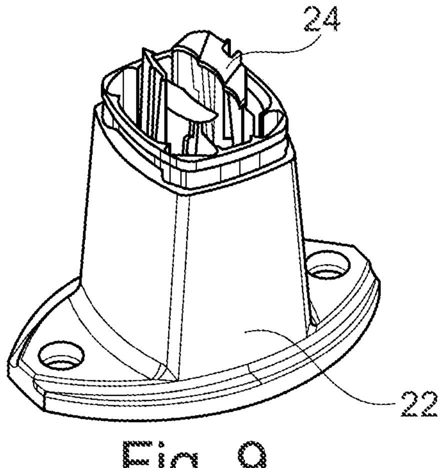
FIG. 9 is a schematic perspective view of a second plug contact housing of the second connector according to the preferred exemplary embodiment of the invention.
Figure 10:
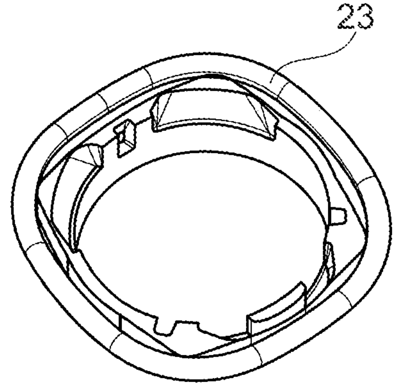
FIG. 10 is a schematic perspective view of a sealing ring of the second connector.

FIG. 9 shows a second plug contact housing 22 made of plastic, into which the second plug contact body 17 is inserted on one side and into which the cable is inserted on an opposite side. A sealing ring 23 is provided between the second plug contact housing 22 and the second connector 17, as shown in detail in FIG. 10. A first part of the sealing ring 23 abuts radially between the second plug contact body 19 and the second plug contact housing 22, as shown in FIGS. 4 and 6. A second part of the sealing ring 23 rests axially on the second plug contact housing 22, as shown in FIG. 5. In the connected state of the first connector 9 with the second connector, as shown in FIG. 4, the second part of the sealing ring 23 seals the plug contact housing 22 with respect to the pot-shaped housing 2.

The second plug contact housing 22 comprises a strain relief 24 for the cable of the first connector on the cable side facing away from the second connector face. The strain relief 24 is formed as a molded plastic part to which the cable is fixed in place by means of a cable tie.

Figure 11:
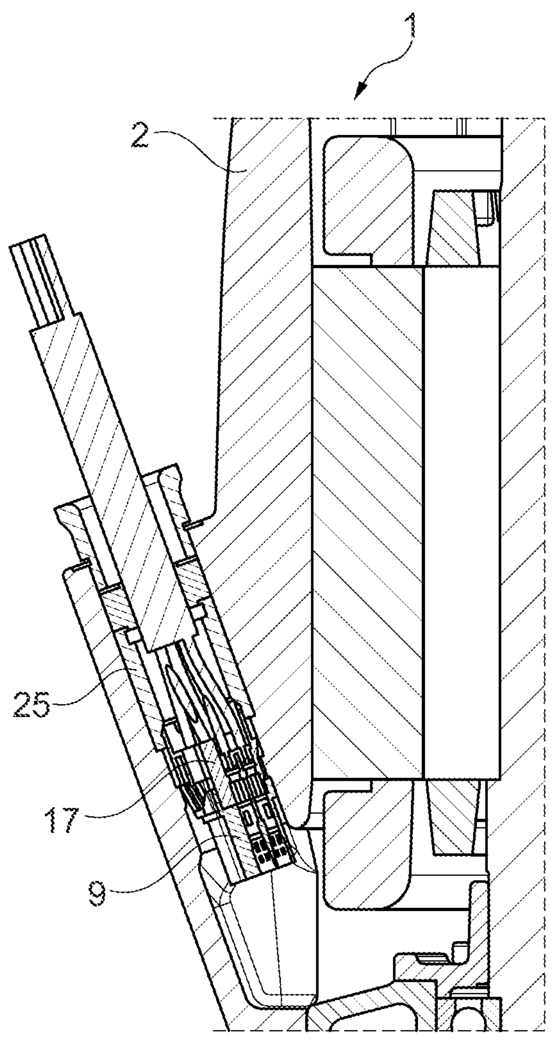
FIG. 11 is a schematic partial sectional view of the submersible motor pump comprising the pot-shaped housing according to another preferred exemplary embodiment of the invention.
Figure 12:
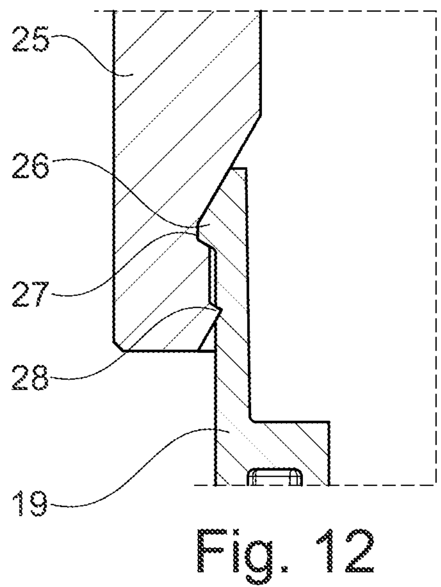
FIG. 12 is a schematic partial sectional view of a part of the second connector of the submersible motor pump of FIG. 11 according to the further preferred exemplary embodiment of the invention.

FIG. 11 shows a schematic partial sectional view of the submersible motor pump 1 comprising the pot-shaped housing 2 according to a further preferred exemplary embodiment of the invention, wherein the pot-shaped housing 2 is configured from gray cast iron. In contrast to the previously described exemplary embodiment, the connector opening 5 is arranged in the outer surface of the pot-shaped housing 2 and pivoted with respect to the axis of the pot-shaped housing 2.

While FIG. 11 shows the first connector 9 with the second connector 17, FIG. 2 shows a part of the second connector 17 in a sectional view. The second connector 17 comprises a metal sleeve 25 extending axially away from the second connector face in an extension of the second plug contact body 19.

The second plug contact body 19 comprises a radially outwardly extending latching lug 26 made of plastic. The metal sleeve 25 comprises a corresponding radially outwardly extending latching recess 27 and a radially inwardly extending latching lug 28 made of metal, which is spaced axially from the latching recess 27. In this way, when the second plug contact body 19 is inserted axially into the metal sleeve 25, the latching lug 28 made of metal first presses the latching lug 26 made of plastic radially inwardly, wherein the second plug contact body 19 latches into the second plug contact body 19 after the latching lug 26 made of plastic has latched into the latching recess 27.

The described exemplary embodiments are merely examples, which may be modified and/or supplemented in a variety of ways within the scope of the claims. Any feature that has been described for a particular exemplary embodiment may be used independently or in combination with other features in any other exemplary embodiment. Any feature that has been described for an exemplary embodiment of a particular category may also be used in a corresponding manner in an exemplary embodiment of another category.

LIST OF REFERENCE SYMBOLS

1 submersible motor pump
2 pot-shaped housing
3 pump housing
4 cover surface
5 connector opening
6 inner space
7 stator
8 windings, especially stranded wires
9 first connector
10 first plug contacts
11 latching lug
12 holding device
13 latching tab opening
14 gripping tab
15 gripping tab opening
16 additional latching tab
17 second connector
18 second plug contacts
19 second plug contact body
20 filling opening
21 overflow volume
22 second plug contact housing
23 sealing ring
24 strain relief
25 metal sleeve
26 latching lug made of plastic
27 latching recess
28 latching lug made of metal

The invention claimed is:

1. A method for producing a submersible motor pump, comprising:

a cylindrical pot-shaped housing forming an inner space between an open base surface and a cover surface axially opposite the base surface, and comprising a connector opening provided in the pot-shaped housing, a motor provided in the inner space and comprising a cylinder-like stator comprising a plurality of windings and a first connector connected to ends of the windings, the first connector comprising a latching tab, a plurality of first plug contacts, and a gripping tab spaced from the latching tab, wherein the latching tab is located at a periphery of the first connector, wherein the gripping tab is located within the periphery of the first connector, wherein the gripping tab defines a gripping tab opening, a second connector connectable to the first connector and comprising a second plug contact body holding a plurality of second plug contacts and forming a second connector face, a second plug contact housing into which the second plug contact body is inserted, and a sealing ring radially surrounding the second plug contact housing, wherein the second connector comprises on the second connector face a filling opening for potting the plurality of second plug contacts in the second plug contact body with potting material and an overflow volume, which is offset axially with respect to the filling opening, for collecting excess potting material emerging from the filling opening, and wherein a first part of the sealing ring is arranged radially between the second plug contact body and the second plug contact housing and a second part of the sealing ring rests axially on the second plug contact housing, and wherein with the second connector connected to the first connector, the second part of the sealing ring seals the second plug contact housing with respect to the pot-shaped housing, and comprising the steps:

gripping the first connector from outside the pot-shaped housing through the connector opening;

inserting the first connector from the inner space into the connector opening; and latching the latching tab to the pot-shaped housing.

2. The method according to claim 1, wherein the gripping tab is radially fixed so that by gripping the gripping tab and the latching tab, the latching tab can be radially compressed for inserting the first connector into the connector opening.

3. The method according to claim 1, comprising a holding device for the first connector, wherein the holding device is arranged in the inner space and is associated with the connector opening, wherein the first connector is arranged in the holding device for gripping the first connector.

4. The method according to claim 1, wherein the first connector has a non-rotationally symmetrical cross-section and the connector opening has a cross-section corresponding to the first connector or a non-corresponding cross-section, so that the first connector is secured against rotation or not in the connector opening.

5. The method according to claim 1, wherein the connector opening is provided in the cover surface or in an outer surface of the pot-shaped housing.

6. The method according to claim 1, wherein the second connector includes a metal sleeve and the second plug contact body is made of plastic, wherein the second plug contact body comprises a radially outwardly extending latching lug made of plastic and the metal sleeve comprises a corresponding radially outwardly extending latching recess and a radially inwardly extending latching lug made of metal such that when the second plug contact body is inserted into the metal sleeve the latching lug made of metal first presses the latching lug made of plastic radially inwards and, after latching of the latching lug made of plastic with the latching recess latches into the second plug contact body.

7. The method according to claim 1, wherein the pot-shaped housing comprises a cover and the connector opening is provided in the cover.

8. The method according to claim 1, comprising an impeller driven by the motor and provided at the base face.

9. The method according to claim 1, comprising the step: gripping the first connector by a tool.

10. A submersible motor pump, comprising:

a cylindrical pot-shaped housing forming an inner space between an open base surface and a cover surface axially opposite the base surface, comprising a connector opening provided in the pot-shaped housing; and a motor provided in the inner space and comprising a cylinder-like stator comprising a plurality of windings and a first connector connected to ends of the windings, the first connector comprising a latching tab, a plurality of first plug contacts, and a gripping tab spaced from the latching tab, wherein the latching tab is located at a periphery of the first connector, wherein the gripping tab is located within the periphery of the first connector, wherein the gripping tab defines a gripping tab opening, and wherein the first connector is insertable from outside the pot-shaped housing through the connector opening from the inner space into the connector opening for latching the latching tab to the pot-shaped housing, and further comprising:

a second connector connectable to the first connector and comprising a second plug contact body holding a plurality of second plug contacts and forming a second connector face, a second plug contact housing into which the second plug contact body is inserted, and a sealing ring radially surrounding the second plug contact housing, wherein the second connector comprises on the second connector face a filling opening for potting the plurality of second plug contacts in the second plug contact body with potting material and an overflow volume, which is offset axially with respect to the filling opening, for collecting excess potting material emerging from the filling opening, and wherein a first part of the sealing ring is arranged radially between the second plug contact body and the second plug contact housing and a second part of the sealing ring rests axially on the second plug contact housing, and wherein with the second connector connected to the first connector, the second part of the sealing ring seals the second plug contact housing with respect to the pot-shaped housing.

11. The submersible motor pump according to claim 10, wherein the gripping tab is radially fixed so that by gripping the gripping tab and the latching tab, the latching tab can be radially compressed for inserting the first connector into the connector opening.

12. The submersible motor pump according to claim 10, comprising a holding device for the first connector, the holding device is arranged in the inner space and is associated with the connector opening, wherein the first connector is arranged in the holding device for gripping the first connector.

13. The submersible motor pump according to claim 10, wherein the first connector has a non-rotationally symmetrical cross-section and the connector opening has a cross-section corresponding to the first connector or a non-corresponding cross-section, so that the first connector is secured against rotation or not in the connector opening.

14. The submersible motor pump according to claim 10, wherein the connector opening is provided in the cover surface or in an outer surface of the pot-shaped housing.

15. The submersible motor pump according to claim 10, wherein the second connector includes a metal sleeve and the second plug contact body is made of plastic, wherein the second plug contact body comprises a radially outwardly extending latching lug made of plastic and the metal sleeve comprises a corresponding radially outwardly extending latching recess and a radially inwardly extending latching lug made of metal such that when the second plug contact body is inserted into the metal sleeve the latching lug made of metal first presses the latching lug made of plastic radially inwards and, after latching of the latching lug made of plastic with the latching recess latches into the second plug contact body.

16. The submersible motor pump according to claim 10, wherein the first connector comprises ten axially symmetrically arranged first plug contacts and a second connector comprises a strain relief for a cable of the second connector, which can be fixed by a cable tie and/or binding wire.

17. The submersible motor pump according to claim 10, wherein the pot-shaped housing is formed from sheet metal.

18. A sewage lifting unit comprising the submersible motor pump according to claim 10.

* * * * *